US009523300B2

(12) United States Patent
Handa (10) Patent No.: US 9,523,300 B2
(45) Date of Patent: Dec. 20, 2016

(54) EXHAUST EMISSION PURIFIER OF INTERNAL COMBUSTION ENGINE (75) Inventor: Hideyuki Handa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1858 days.

(21) Appl. No.: 12/451,349

(22) PCT Filed: May 2, 2008

(86) PCT No.: PCT/JP2008/058400
§ 371 (c)(1),
(2), (4) Date: Nov. 9, 2009

(87) PCT Pub. No.: WO2008/139966
PCT Pub. Date: Nov. 20, 2008

(65) Prior Publication Data
US 2010/0089040 A1 Apr. 15, 2010

(30) Foreign Application Priority Data

May 15, 2007 (JP) .................................. 2007-129608

(51) Int. Cl.
F01N 3/00 (2006.01)
F01N 3/035 (2006.01)
(Continued)

(52) U.S. Cl.
CPC ............. *F01N 3/035* (2013.01); *B01D 53/944* (2013.01); *B01D 53/9495* (2013.01);
(Continued)

(58) Field of Classification Search
CPC ..... B01D 53/944; B01D 53/96; F01N 3/0253; F01N 3/035
(Continued)

(56) References Cited

U.S. PATENT DOCUMENTS 6,938,411 B2    9/2005  Hoffmann et al.
2003/0106306 A1*  6/2003  Nakatani et al. ............... 60/288
(Continued)

FOREIGN PATENT DOCUMENTS

DE          198 55 090 A1   5/2000
DE    10 2005 032 941 A1   1/2007
(Continued)

OTHER PUBLICATIONS

International Search Report issued in International Application No. PCT/JP2008/058400; Mailed on Jun. 3, 2008.
International Preliminary Report on Patentability issued on Nov. 24, 2009 in corresponding International Application No. PCT/JP2008/058400.
Dec. 27, 2011 Extended Search Report issued in European Patent Application No. 08752305.6.

Primary Examiner — Jason Shanske
(74) Attorney, Agent, or Firm — Oliff PLC (57) ABSTRACT An electronic control unit estimates the amount of sulfur accumulated in a filter for purifying PM and NOx based on the operating state of an engine. When an estimated value is equal to or greater than a predetermined determination value, a first regeneration procedure is executed, in which sulfur is released from the filter by raising the temperature of the filter up to a first predetermined temperature and lowering the exhaust air-fuel ratio. When predetermined conditions are met the second regeneration procedure is executed separately from the first regeneration procedure. In the second regeneration procedure, sulfur is completely released from the filter by raising the temperature of the filter up to a temperature higher than the first temperature and lowering the exhaust air-fuel ratio. The estimated value is reset upon completion of the second regeneration procedure.

12 Claims, 3 Drawing Sheets (51) Int. Cl.
*B01D 53/94* (2006.01)
*B01D 53/96* (2006.01)
*F01N 3/025* (2006.01)
*F01N 3/08* (2006.01)
*F01N 9/00* (2006.01)
*F02D 41/02* (2006.01)
*F01N 3/20* (2006.01)

(52) U.S. Cl.
CPC ............ *B01D 53/96* (2013.01); *F01N 3/0253* (2013.01); *F01N 3/085* (2013.01); *F01N 3/0885* (2013.01); *F01N 9/002* (2013.01); *F02D 41/028* (2013.01); *F02D 41/029* (2013.01); *B01D 2251/208* (2013.01); *B01D 2255/91* (2013.01); *B01D 2257/302* (2013.01); *B01D 2257/404* (2013.01); *B01D 2258/012* (2013.01); *F01N 3/2033* (2013.01); *F01N 2260/04* (2013.01); *F01N 2560/025* (2013.01); *F01N 2560/06* (2013.01); *F01N 2570/04* (2013.01); *F02D 2200/0812* (2013.01); *F02D 2200/0818* (2013.01); *Y02T 10/47* (2013.01)

(58) Field of Classification Search
USPC .......................................................... 60/295
See application file for complete search history.

(56) References Cited

U.S. PATENT DOCUMENTS

| | | |
|---|---|---|
| 2003/0131591 A1* | 7/2003 | Pott et al. ................. 60/295 |
| 2004/0025499 A1 | 2/2004 | Nakatani et al. |
| 2004/0050035 A1 | 3/2004 | Smaling |
| 2007/0101701 A1* | 5/2007 | Acke et al. ................ 60/286 |
| 2008/0279742 A1 | 11/2008 | Arlt et al. |

FOREIGN PATENT DOCUMENTS

| | | |
|---|---|---|
| EP | 0 858 837 A2 | 8/1998 |
| EP | 1 491 736 A1 | 12/2004 |
| EP | 1 600 612 A1 | 11/2005 |
| FR | 2 819 854 A1 | 7/2002 |
| FR | 2 843 419 A1 | 2/2004 |
| JP | A-2001-280179 | 10/2001 |
| JP | A-2002-364349 | 12/2002 |
| JP | A-2003-293747 | 10/2003 |
| JP | A-2005-083298 | 3/2005 |
| JP | A-2005-256720 | 9/2005 |
| JP | A-2005-291039 | 10/2005 |

* cited by examiner

EXHAUST EMISSION PURIFIER OF INTERNAL COMBUSTION ENGINE

FIELD OF THE INVENTION

The present invention relates to an exhaust emission purifier of an internal combustion engine that has a catalyst in an exhaust passage and purifies exhaust gas by the catalyst.

BACKGROUND OF THE INVENTION

Conventionally, in this kind of exhaust emission purifier of an internal combustion engine, for example as described in Patent Document 1, a predetermined regeneration procedure is executed for recovering exhaust purification catalyst such as NOx storage reduction catalyst arranged in an exhaust system of the internal combustion engine from sulfur poisoning. In the regenerating procedure, the amount of sulfur accumulated in a catalyst is estimated based on an operating state of the engine. If the estimated value of the amount of sulfur is equal to or greater than a predetermined determination value, the regenerating procedure is executed. In the regenerating procedure, the temperature of the catalyst is raised by injecting fuel to the exhaust passage by a fuel adding valve or executing post fuel injection and the exhaust air-fuel ratio is made to be in the stoichiometric air-fuel ratio or richer than the stoichiometric air-fuel ratio, so that the sulfur is released from the catalyst.

Patent Document 1: Japanese Laid-Open Patent Publication No. 2005-83298

SUMMARY OF THE INVENTION

When an estimated value of the amount of accumulated sulfur is estimated based on the operating state of the engine, deviation may be caused between the estimated value and the actual amount of accumulated sulfur. Therefore, if the sulfur is repeatedly accumulated in and released from the catalyst as the engine operates, the deviation between the estimated value of the amount of accumulated sulfur and the actual amount of accumulated sulfur may gradually increase. Therefore, even if the actual amount of the accumulated sulfur is equal to or greater than the determination value that is an execution condition for the regeneration procedure, the regeneration procedure is not executed because the estimated value of the amount of accumulated sulfur is lower than the determination value. In this case, the exhaust gas purifying function of the catalyst is not recovered by the regeneration procedure. This deteriorates emission.

This problem may be caused not only when sulfur is accumulated in the catalyst, but also when a poisoning material that lowers the exhaust gas purifying function of the catalyst, such as an aromatic compound, a chlorine compound, a phosphor compound, a silicon compound, is accumulated in the catalyst.

An objective of the present invention is to provide an exhaust emission purifier of an internal combustion engine that appropriately corrects deviation between the actual amount of accumulated poisoning material and an estimated value of the amount of the accumulated poisoning material even if the deviation increases, and prevents the emission from deteriorating.

Hereinafter, means for solving the problems and operations and effects will be explained.

According to a first aspect of the present invention, in the exhaust emission purifier of an internal combustion engine is provided. The exhaust emission purifier has a catalyst that is provided in an exhaust system of the internal combustion engine to purify exhaust gas, estimation section for estimating an amount of accumulated poisoning material in the catalyst based on an operating state of the engine, and regeneration section for executing a first regeneration procedure. In the first regeneration procedure, on condition that an estimated value of the amount of accumulated poisoning material is equal to or greater than a predetermined determination value, the poisoning material is released from the catalyst by raising a temperature of the catalyst up to a first predetermined temperature and lowering an exhaust air-fuel ratio. When predetermined conditions are met, the regeneration section executes a second regeneration procedure separately from the first regeneration procedure. In the second regeneration procedure, the poisoning material is completely released from the catalyst by raising the temperature of the catalyst up to a temperature higher than the first temperature and lowering the exhaust air-fuel ratio. The estimation section resets the estimated value of the amount of accumulated poisoning material upon completion of the second regeneration procedure by the regeneration section.

In this case, on condition that the estimated value of the amount of accumulated poisoning material is equal to or greater than the predetermined determination value, the first regeneration procedure is executed to release the poisoning material accumulated in the catalyst. This recovers the exhaust gas purifying function of the catalyst.

When the estimated value of the amount of accumulated poisoning material is estimated based on the operating state of the engine, deviation may be caused between the estimated value and the actual amount of accumulated poisoning material. Therefore, if the poisoning material is repeatedly accumulated in and released from the catalyst as the engine operates, the deviation between the estimated value of the amount of accumulated poisoning material and the actual amount of accumulated poisoning material may gradually increase. Therefore, even if the actual amount of the accumulated poisoning material is equal to or greater than the determination value that is an execution condition for the first regeneration procedure, the first regeneration procedure is not executed at an appropriate timing because the estimated value of the amount of accumulated poisoning material is lower than the determination value. In this case, the exhaust gas purifying function of the catalyst is not recovered because the first regeneration procedure is not executed. This deteriorates emission. In this respect, according to the first aspect, when predetermined conditions are met, the second regeneration procedure for raising the temperature of the catalyst up to a temperature higher than the first temperature and lowering the exhaust air-fuel ratio is executed to release the poisoning material completely from the catalyst, and the estimated value of the amount of accumulated poisoning material is reset upon completion of the second regeneration procedure. Accordingly, even if the deviation between the actual amount of the accumulated poisoning material and the estimated value of the amount of the accumulated poisoning material increases, the deviation can be corrected appropriately and the emission is prevented from deteriorating.

When the temperature of the catalyst is raised in the first and second regeneration procedures, the temperature of the catalyst during the regeneration procedure is preferably set to be within such a temperature range that thermal deterioration of the catalyst does not progress. If the temperature of the catalyst is low, the poisoning material is not sufficiently released and the regeneration procedure may be halted before the poisoning material is completely released from the catalyst. Thus, for example, in the first regeneration procedure, prevention of thermal deterioration of the catalyst is prioritized. Specifically, when the temperature of the catalyst is raised, its maximum temperature is set to be within the temperature range that does not cause thermal deterioration of the catalyst for preventing the thermal deterioration of the catalyst. In the second regeneration procedure, early regeneration of the catalyst is prioritized. Specifically, the temperature of the catalyst is raised to a temperature that may cause thermal deterioration of the catalyst for shortening the regeneration period. Accordingly, even if the temperature of the catalyst is raised to the temperature that may cause thermal deterioration of the catalyst, the period of the regeneration procedure of the catalyst is shortened. This sufficiently suppresses damage caused by heat.

According to a second aspect of the present invention, an exhaust emission purifier of an internal combustion engine is provided. The exhaust emission purifier includes a catalyst that is provided in an exhaust system of the internal combustion engine to purify exhaust gas, estimation section for estimating an amount of accumulated poisoning material in the catalyst based on an operating state of the engine, and regeneration section for executing a first regeneration procedure. In the first regeneration procedure, on condition that an estimated value of the amount of accumulated poisoning material is equal to or greater than a predetermined determination value, the poisoning material is released from the catalyst by raising a temperature of the catalyst for a first predetermined period and lowering an exhaust air-fuel ratio. The regeneration section executes a second regeneration procedure separately from the first regeneration procedure. In the second regeneration procedure, the poisoning material is completely released from the catalyst by raising the temperature of the catalyst for a period longer than the first predetermined period and lowering the exhaust air-fuel ratio. The estimation section resets the estimated value of the amount of accumulated poisoning material upon completion of the second regeneration procedure by the regeneration section.

In this case, on condition that the estimated value of the amount of accumulated poisoning material is equal to or greater than the determination value, the first regeneration procedure is executed to release the poisoning material accumulated in the catalyst. Accordingly, the exhaust purifying function of the catalyst is recovered.

When the estimated value of the amount of accumulated poisoning material is estimated based on the operating state of the engine, deviation may be caused between the estimated value and the actual amount of accumulated poisoning material. Therefore, if the poisoning material is repeatedly accumulated in and released from the catalyst as the engine operates, the deviation between the estimated value of the amount of accumulated poisoning material and the actual amount of accumulated poisoning material gradually increases. Therefore, even if the actual amount of accumulated poisoning material is equal to or greater than the determination value that is an execution condition for the first regeneration procedure, the first regeneration procedure may not be carried out at an appropriate timing since the estimated value of the amount of accumulated poisoning material is lower than the determination value. In this case, since the first regeneration procedure is not carried out, the exhaust gas purifying function of the catalyst is not recovered, and this deteriorates emission.

In this respect, according to the second aspect, when predetermined conditions are met, the second regeneration procedure for raising the temperature of the catalyst for a period longer than the first predetermined period and lowering the exhaust air-fuel ratio is executed for releasing the poisoning material completely from the catalyst, and the estimated value of the amount of accumulated poisoning material is reset upon completion of the second regeneration procedure. Accordingly, even if the deviation between the actual amount of accumulated poisoning material and the estimated value increases, the deviation can be corrected appropriately and the emission is prevented from deteriorating.

According to a third aspect of the present invention, an exhaust emission purifier of an internal combustion engine is provided. The exhaust emission purifier includes a catalyst that is provided in an exhaust system of the internal combustion engine to purify exhaust gas, estimation section for estimating an amount of accumulated poisoning material in the catalyst based on an operating state of the engine, and regeneration section for executing a first regeneration procedure. In the first regeneration procedure, on condition that an estimated value of the amount of accumulated poisoning material is equal to or greater than a predetermined determination value, the poisoning material is released from the catalyst by raising a temperature of the catalyst up to a first predetermined temperature for a first predetermined period and lowering an exhaust air-fuel ratio. When predetermined conditions are met, the regeneration section executes a second regeneration procedure separately from the first regeneration procedure. In the second regeneration procedure, the poisoning material is completely released from the catalyst by raising the temperature of the catalyst for a period longer than the first predetermined period up to a temperature higher than the first temperature and lowering the exhaust air-fuel ratio. The estimation section resets the estimated value of the amount of accumulated poisoning material upon completion of the second regeneration procedure by the regeneration section.

In this case, on condition that the estimated value of the amount of accumulated poisoning material is equal to or greater than the determination value, the first regeneration procedure is executed to release the poisoning material accumulated in the catalyst. Accordingly, the exhaust purifying function of the catalyst is recovered.

When the estimated value of the amount of accumulated poisoning material is estimated based on the operating state of the engine, deviation may be caused between the estimated value and the actual amount of accumulated poisoning material. Therefore, if the poisoning material is repeatedly accumulated in and released from the catalyst as the engine operates, the deviation between the estimated value of the amount of accumulated poisoning material and the actual amount of accumulated poisoning material gradually increases. Therefore, even if the actual amount of accumulated poisoning material is equal to or greater than the determination value that is an execution condition for the first regeneration procedure, the first regeneration procedure may not be carried out at an appropriate timing since the estimated value of the amount of accumulated poisoning material is lower than the determination value. In this case, since the first regeneration procedure is not carried out, the exhaust gas purifying function of the catalyst is not recovered, and this deteriorates emission.

In this respect, according to the third aspect, when predetermined conditions are met, the second regeneration procedure for raising the temperature of the catalyst for a period longer than the first predetermined period up to a temperature higher than the first temperature and lowering the exhaust air-fuel ratio is executed to release the poisoning material completely from the catalyst, and the estimated value of the amount of accumulated poisoning material is reset upon completion of the second regeneration procedure. Accordingly, even if the deviation between the actual amount of accumulated poisoning material and the estimated value increases, the deviation can be corrected appropriately, and the emission is prevented from deteriorating.

The temperature and the period when the temperature of the catalyst is raised in the second regeneration procedure are preferably set as follows. As the deviation between the actual amount of accumulated poisoning material and the estimated value is determined to be greater, the temperature of the catalyst in the second regeneration procedure is set to be higher and the execution period of the second regeneration procedure is set to be longer. If the deviation degree between the actual amount of the accumulated poisoning material and the estimated value is the same, the execution period of the second regeneration procedure is preferably set to be shorter as the temperature of the catalyst in the second regeneration procedure is set to be higher.

The internal combustion engine is preferably mounted in a vehicle, and, when the logical OR of the following conditions (1) to (4) is true, the regeneration section preferably determines that a predetermined execution condition is met and executes the second regeneration procedure.

(1) The number of execution times of the first regeneration procedure after execution of the second regeneration procedure is equal to or greater than a determination number of times.

(2) The traveled distance of the vehicle after the execution of the second regeneration procedure is equal to or longer than a determination distance.

(3) The engine operation time after the execution of the second regeneration procedure is equal to or longer than a determination period.

(4) The accumulated value of a fuel injection amount after the execution of the second regeneration procedure is equal to or greater than a predetermined amount.

The internal combustion engine is preferably mounted in a vehicle, and, when the logical AND of the following conditions (1) to (4) is true, the regeneration means preferably determines that a predetermined execution condition is met and executes the second regeneration procedure.

(1) The number of execution times of the first regeneration procedure after execution of the second regeneration procedure is equal to or greater than a determination number of times, (2) The traveled distance of the vehicle after the execution of the second regeneration procedure is equal to or longer than a determination distance, (3) The engine operation time after the execution of the second regeneration procedure is equal to or longer than a determination period, (4) The accumulated value of a fuel injection amount after the execution of the second regeneration procedure is equal to or greater than a predetermined amount.

The deviation between the actual amount of accumulated poisoning material and the estimated amount changes according to the operating state of the engine such as characteristics of fuel, the exhaust temperature, the exhaust flow rate, and the air-fuel ratio. Therefore, it is difficult to obtain an accurate deviation, and also it is difficult to obtain the deterioration degree of the purifying function of the catalyst that is caused by the deposition of the poisoning material.

In this respect, if the second regeneration procedure is executed on condition that at least one of the conditions (1) to (4) is met, the poisoning material accumulated in the catalyst is reliably released before the actual amount of accumulated poisoning material is excessively separated from the estimated value. This eliminates deterioration of the exhaust gas purifying function of the catalyst at an early stage.

On the other hand, in the case where the second regeneration procedure is executed on condition that all the conditions (1) to (4) are met, if the deviation between the actual amount of accumulated poisoning material and the estimated value is small and reduction of the exhaust gas purifying function of the catalyst does not cause any problems, ineffective execution of the ineffective second regeneration procedure is avoided. Therefore, it is possible to prevent any limitation from being applied to the engine control according to the execution of the second regeneration procedure.

In a case where the poisoning material is sulfur, various parameters for executing the second regeneration procedure such as the temperature of the catalyst or the execution period in raising the temperature of the catalyst are set, and the accumulated sulfur is reliably released from the catalyst by the second regeneration procedure. In this description, "sulfur" also includes its compounds. According to the above aspects, the exhaust emission purifier of the internal combustion engine of the present invention can remove from the catalyst any poisoning material that lowers the function of the catalyst and is releasable from the catalyst by raising the temperature of the catalyst. The poisoning materials include aromatic compounds, chlorine compounds, phosphor compounds, silicon compounds.

DETAILED DESCRIPTION OF THE PREFERRED EMBODIMENTS

An exhaust emission purifier of a diesel engine according to one embodiment of the present invention will be described with reference to FIGS. 1 to 3.

Figure 1:
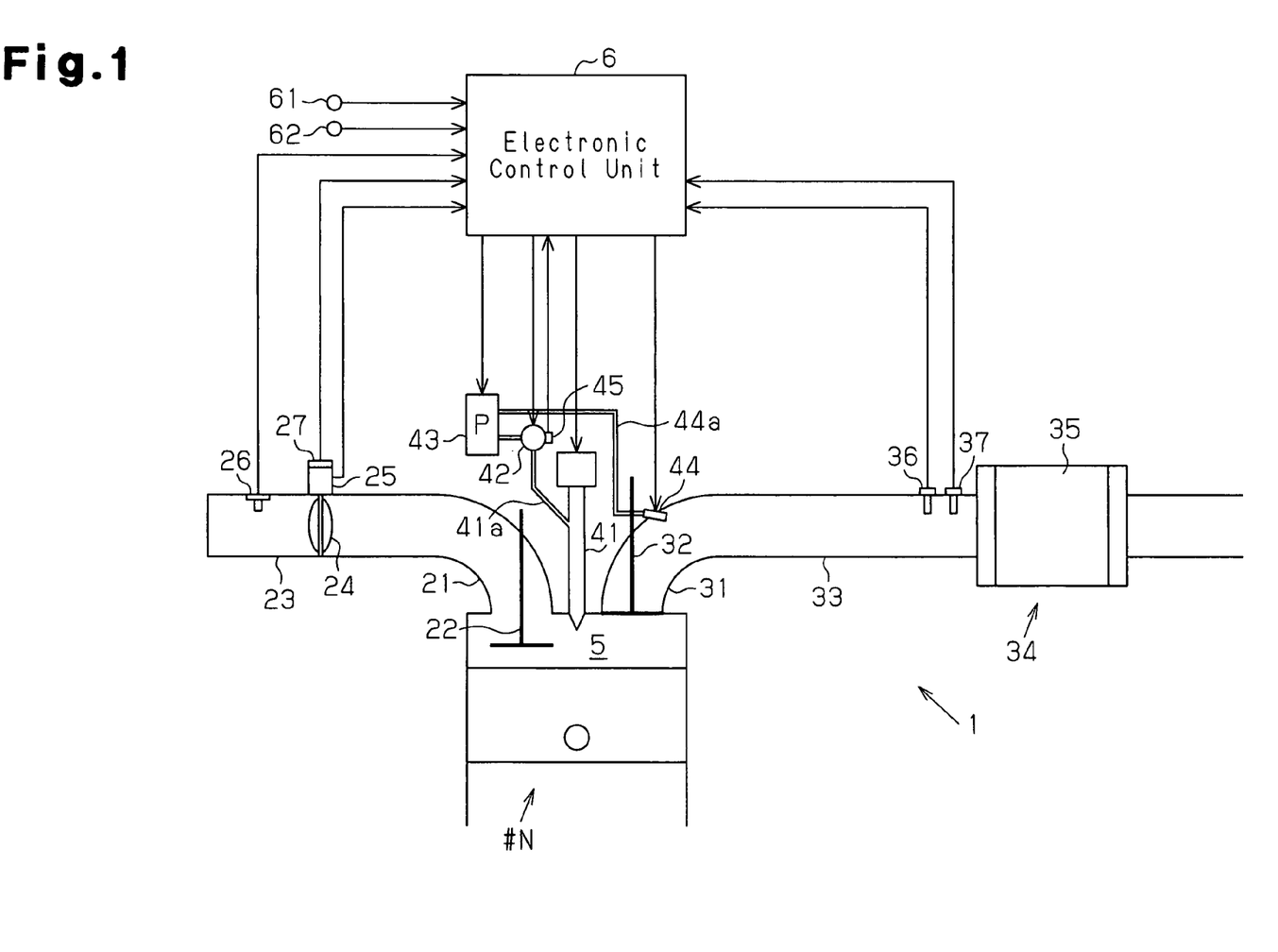
FIG. 1 is a block diagram showing a general configuration of a diesel engine and a controller according to one embodiment of the present invention.

FIG. 1 is a block diagram showing a controller of a diesel engine provided with the exhaust emission purifier of the present embodiment and an engine having the controller and its surrounding configurations.

The engine 1 has a plurality of cylinders #N (N=1 to 4) and a plurality of fuel injection valves 41 each of which corresponds one of the cylinders #N. Each cylinder #N of the engine 1 is connected to an intake port 21 that introduces outer air to the cylinder #N and an exhaust port 31 that discharges combustion gas to the outside of the cylinder #N.

An intake valve 22 is provided in each intake port 21 to open and close the intake port 21. An intake passage 23 is connected to each intake port 21 via an intake manifold. A throttle valve 24 for adjusting an amount of intake air is provided in the intake passage 23. The throttle valve 24 is opened and closed by a motor 25.

An exhaust valve 32 is provided in each exhaust port 31 to open and close the exhaust port 31. An exhaust passage 33 is connected to each exhaust port 31 via an exhaust manifold. A converter 34 for purifying exhaust gas is arranged on the exhaust passage 33. A filter 35 is provided in the converter 34. The filter 35 is comprised of a porous ceramic structure for capturing PM (particulate matter) in the exhaust gas and a NOx storage reduction catalyst that is supported on a surface of the ceramic structure. The PM contained in the exhaust gas is captured by the filter 35 when passing through a porous wall. When the air-fuel ratio of the exhaust gas is higher than the stoichiometric air-fuel ratio, that is, when the exhaust gas is in an oxidation atmosphere, NOx contained in the exhaust gas is stored by the filter 35. On the other hand, when the air-fuel ratio of the exhaust gas is equal to or lower than the stoichiometric air-fuel ratio, that is, when the exhaust gas is in a reduction atmosphere, NOx stored in the filter 35 is desorbed as NO and reduced by HC or CO.

Each fuel injection valve 41 is connected to a common rail 42 via a fuel supply pipe 41a. A fuel pump 43 is connected to the common rail 42 and high-pressure fuel is supplied to the common rail 42 by the fuel pump 43. The high-pressure fuel supplied to the common rail 42 is injected to the combustion chamber 5 of each cylinder #N via the opened fuel injection valve 41. The fuel pump 43 supplies low-pressure fuel to a fuel adding valve 44 via a fuel supply pipe 44a. The fuel adding valve 44 injects fuel to the exhaust passage 33 so as to supply the fuel to the filter 35, specifically to the NOx storage reduction catalyst.

The engine 1 is provided with various sensors for detecting the operating state of the engine. For example, an airflow meter 26 that is located upstream of the intake passage 23 detects an intake air amount GA. A throttle opening degree sensor 27 is provided to a motor 25 that opens and closes the throttle valve 24. The throttle opening degree sensor 27 detects an opening degree (throttle opening degree TA) of the throttle valve 24. An exhaust temperature sensor 36 that is located upstream of the filter 35 detects a temperature Te of exhaust gas that flows into the filter 35. An air-fuel ratio sensor 37 that is located upstream of the filter 35 detects an air-fuel ratio A/F of exhaust gas that flows into the filter 35. A fuel pressure sensor 45 is provided to the common rail 42. The fuel pressure sensor 45 detects fuel pressure in the common rail 42, that is, fuel injection pressure. A crank angle sensor 61 is provided in the vicinity of a crankshaft of the engine 1. The crank angle sensor 61 detects a rotation speed of the crankshaft, that is an engine rotation speed. An acceleration sensor 62 that is provided to an accelerator pedal detects a depressed amount of the accelerator pedal, that is an accelerator pedal depressed amount ACCP.

Output signals from the sensors are supplied to the electronic control unit 6. The electronic control unit 6 is comprised of a microcomputer that includes a central procedure unit (CPU), a read only memory (ROM) that previously stores various programs and maps, a random access memory (RAM) that temporally stores computation results obtained by the CPU, a timer counter, an input interface, and an output interface.

The electronic control unit 6 executes various control procedures of the engine 1. For example, the electronic control unit 6 controls the fuel injection amount and the fuel injection timing of the fuel injection valves 41, the discharge pressure of the fuel pump 43, and the opening degree of the throttle valve 24. The electronic control unit 6 also executes various exhaust gas purifying control procedures such as first regeneration procedure for releasing sulfur from the filter 35.

In the first regeneration procedure, the amount of sulfur accumulated in the filter 35 is estimated based on the operating state of the engine to regenerate the filter 35 from the sulfur poisoned state. On condition that the estimated value Sx of the amount of accumulated sulfur is equal to or greater than a predetermined determination value Smax, fuel is injected from the fuel adding valve 44 to the exhaust passage 33 to supply the fuel to the filter 35. Accordingly, catalyst bed temperature of the filter 35 is raised to a predetermined temperature α and the air-fuel ratio A/F of the exhaust gas is made to be in the stoichiometric state or richer than the stoichiometric state so as to release sulfur from the catalyst.

A computation process of the estimated value Sx of the amount of accumulated sulfur that is executed by the electronic control unit 6 will be explained.

When the first regenerating procedure is not being executed, the estimated value Sx of the amount of accumulated sulfur is computed using expression 1.

$$Sx = Sxold + Sinc \qquad \text{(Expression 1)}$$

The previous estimated value Sxold on the right side is the estimated value Sx of the amount of accumulated sulfur that is computed at a previous control cycle. An estimated value increase amount Sinc corresponds to an amount of sulfur that is accumulated in the filter 35 during a period from the previous control cycle to the current control cycle. The estimated value increase amount Sinc is computed based on the fuel injection amount from the fuel injection valves 41 and the fuel addition amount from the fuel adding valve 44. The greater the fuel injection amount from the fuel injection valves 41 and the greater the fuel addition amount from the fuel adding valve 44, the greater the estimated value increase amount Sinc becomes. When the first regeneration procedure is not being executed, the estimated value increase amount Sinc is computed assuming that the fuel addition amount from the fuel adding valve 44 is zero. On the other hand, when the fuel is added by the fuel adding valve 44 as the reducing agent for reducing NOx in the NOx storage reduction catalyst, the estimated value increase amount Sinc is computed based on the addition amount.

Next, when the first regeneration procedure is being executed, the estimated value Sx of the amount of accumulated sulfur is computed using expression 2.

$$Sx = Sxold + Sinc - Sdec \qquad \text{(Expression 2)}$$

The previous estimated value Sxold and the estimated value increase amount Sinc at the right side are the same as the above expression 1. The estimated value decrease amount Sdec corresponds to the amount of sulfur that is released from the filter 35 during a period from the previous control cycle to the current control cycle. The estimated value decrease amount Sdec is computed based on the exhaust air-fuel ratio A/F and the exhaust gas temperature Te, in other words, based on the catalyst bed temperature of the filter 35. The richer the exhaust air-fuel ratio A/F and the higher the exhaust gas temperature Te, the greater the estimated value decrease amount Sdec tends to become. When the first regeneration procedure is being executed, the estimated value decrease amount Sdec is greater than the estimated value increase amount Sinc (Sdec>Sinc) and the estimated value Sx of the amount of accumulated sulfur reduces.

When the estimated value Sx of the amount of accumulated sulfur is estimated based on the operating state of the engine, deviation may be caused between the estimated value Sx and the actual amount of accumulated sulfur. Therefore, if sulfur is repeatedly accumulated in and released from the filter 35 as the engine 1 operates, the deviation between the estimated value Sx of the amount of accumulated sulfur and the actual amount of accumulated sulfur Sc gradually increases. Therefore, even if the actual amount of accumulated sulfur Sc is equal to or greater than the determination value Smax that is an execution condition for the regeneration procedure, the regeneration procedure may not be carried out since the estimated value Sx of the amount of accumulated sulfur is lower than the determination value Smax.

In the present embodiment, when the number of execution times N of the first regeneration procedure reaches a determination number of times A, the second regeneration procedure is executed separately from the first regeneration procedure. In the second regeneration procedure, the temperature of the filter 35 is raised up to a temperature $\beta$ (>$\alpha$), which is higher than the temperature $\alpha$ in the first regeneration procedure, and sulfur is released from the filter 35 completely by lowering the exhaust air-fuel ratio A/F. When the second regeneration procedure is completed, the estimated value Sx of the amount of accumulated sulfur is reset.

Figure 2:
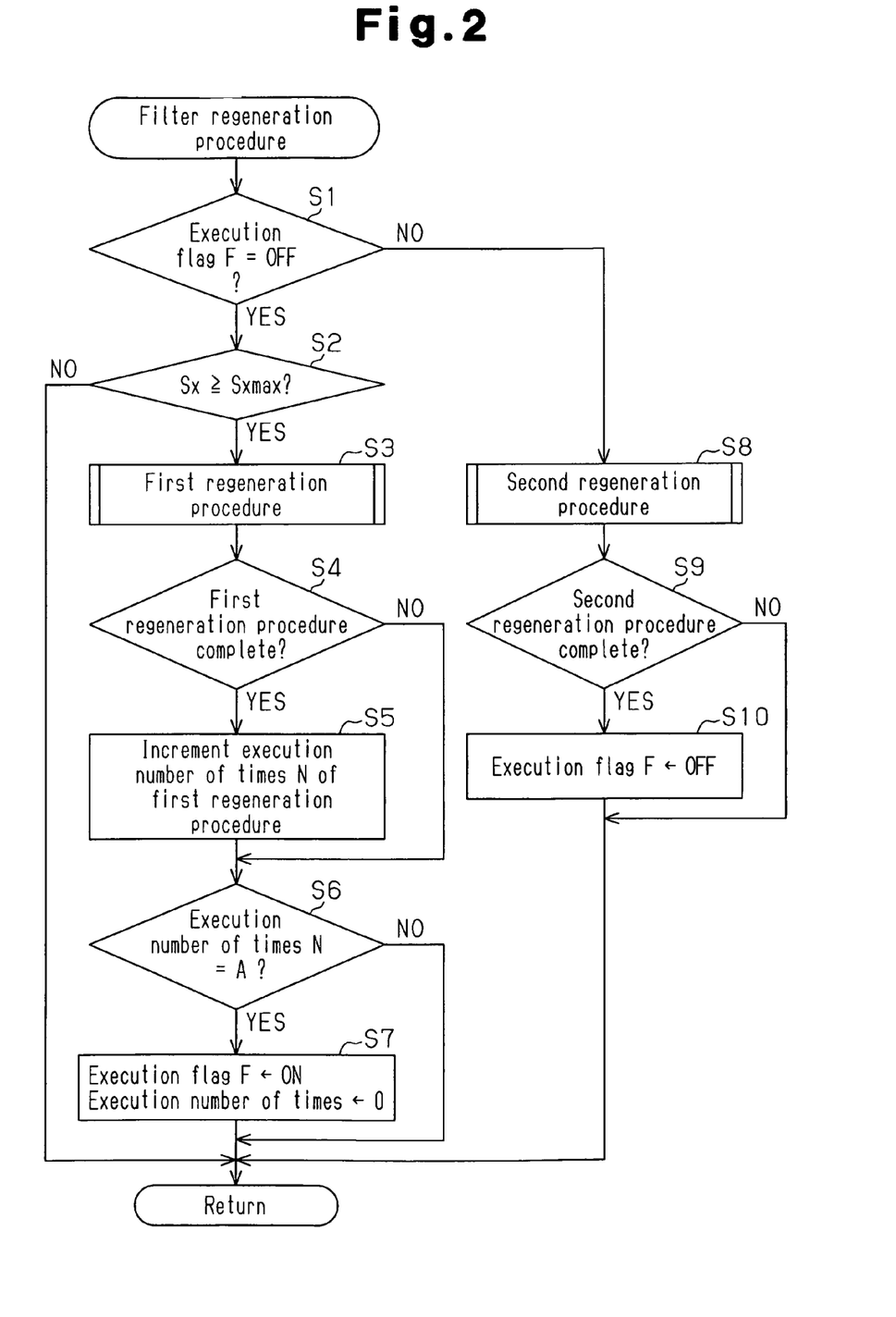
FIG. 2 is a flowchart showing a specific steps of a filter regeneration procedure that is executed by an electronic control unit according to the embodiment.

FIG. 2 is a flowchart showing specific process steps of the two filter regeneration procedures, which are executed by the electronic control unit 6. A series of processes are repeatedly executed by the electronic control unit 6 at a predetermined cycle.

As shown in FIG. 2, in the series of processes, it is determined whether an execution flag F that indicates that the second regeneration procedure is being executed is OFF (step S1). If the execution flag F is OFF (step S1: YES), it is determined whether the estimated value Sx of the amount of accumulated sulfur is equal to or greater than a predetermined determination value Sxmax (step S2). If the estimated value Sx of the amount of accumulated sulfur is equal to or greater than the determination value Sxmax (step S2: YES), the first regeneration procedure is executed (step S3).

If the estimated value Sx of the amount of accumulated sulfur is smaller than the determination value Sxmax (step S2: NO), the procedure is temporally terminated.

In the first regeneration procedure of step S3, fuel is injected to the exhaust passage 33 by the fuel adding valve 44 so as to be supplied to the filter 35. Accordingly, the temperature of the filter 35 is raised to the temperature $\alpha$ and the air-fuel ratio A/F of the exhaust gas is made to be in the stoichiometric state or richer than the stoichiometric state so as to release sulfur from the filter 35.

When the first regeneration procedure is thus executed, it is determined whether the first regeneration procedure is completed (step S4). When it is determined that the estimated value Sx of the amount of accumulated sulfur is lowered to be a determination value Smin that indicates that the exhaust gas purifying function of the filter 35 is sufficiently recovered, it is determined that the first regeneration procedure is completed. If the first regeneration procedure is completed (step S4: YES) as the result of the above determination, the execution number of times N of the first regeneration procedure after the execution of the previous second regeneration procedure is incremented (step S5) and the process proceeds to step S6. If the first regeneration procedure is not completed (step S4: NO), the execution number of times of the first regeneration procedure is not incremented and the process proceeds to step S6.

In step S6, it is determined whether the execution number of times N of the first regeneration procedure has reached the determination number of times A. If the execution number of times N of the first regeneration procedure has reached the determination number of times A (step S6: YES), the execution flag F of the second regeneration procedure is set to ON and the execution number of times N of the first regeneration procedure is reset to zero (step S6). Then the series of processes are temporally terminated. The deviation between the actual amount of accumulated sulfur Sc and the estimated value Sx gradually increases as the execution number of times of the first regeneration procedure increases. Therefore, the determination number of times A is set to a value at which the deviation between the actual amount of accumulated sulfur Sc, which is caused by the actual execution of the first regeneration procedure, and the estimated value Sx is assumed to have reached a non-negligible level. If the execution number of times N of the first regeneration procedure is smaller than the determination number of times A (step S6: NO), the series of processes are temporally terminated.

If the execution flag F that indicates that the second regeneration procedure is being executed is ON (step S1: NO), the process proceeds to the second regeneration procedure (step S8). In the second regeneration procedure, the temperature of the filter 35 is raised to be the temperature $\beta$ for a predetermined period T, and the air-fuel ratio A/F of the exhaust gas is made to be in the stoichiometric state or richer than the stoichiometric state so as to completely release sulfur from the filter 35. The temperature $\beta$ of the filter 35 and the predetermined period T are determined based on experiments so as to be value that completely release sulfur from the filter.

Next, it is determined whether the second regeneration procedure is completed (step S9). If the execution period of the second regeneration procedure has reached the predetermined period T, it is determined that the second regeneration procedure is completed. If the second regeneration procedure is completed (step S9: YES) as the result of the above determination, the execution flag F is set to OFF (step S10) and the series of processes are temporally terminated. If the second regeneration procedure is not completed (step S9: NO), the series of processes are temporally terminated.

Next, with reference to the timing chart of FIG. 3, changes in the execution number of times N of the first regeneration procedure, changes in the actual amount of accumulated sulfur of the filter 35 and the estimated value Sx when the series of processes shown in FIG. 2 are executed will be explained.

As shown in FIG. 3(*a*), when the estimated value Sx of the amount of accumulated sulfur of the filter 35 is equal to or greater than the determination value Smax at time t1, the first regeneration procedure is executed. If the estimated value Sx of the amount of accumulated sulfur is lowered to the determination value Smin at time t2, the first regeneration procedure is completed and halted. At this time, as shown by a solid line in FIG. 3(*d*), the estimated value Sx of the amount of accumulated sulfur increases during a period from time t0 to time t1 and decreases during the execution of the first regeneration procedure (a period from time t1 to time t2).

Figure 3A:
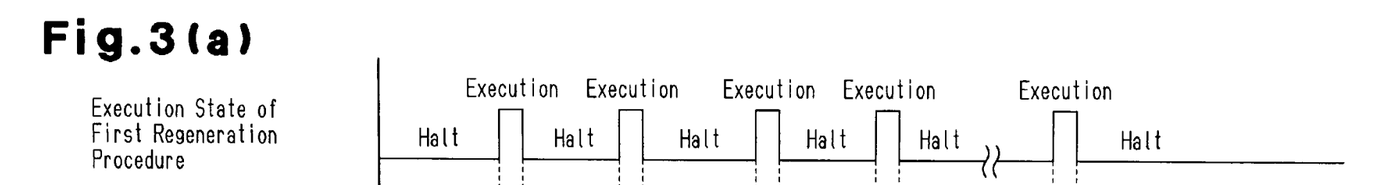
FIG. 3 is a timing chart in which section (a) shows changes in the execution state of a first regeneration procedure, section (b) shows changes in the execution time of the first regeneration procedure, section (c) shows changes in the execution state of a second regeneration procedure, and section (d) shows changes in the actual amount of accumulated sulfur and an estimated value.
Figure 3B:
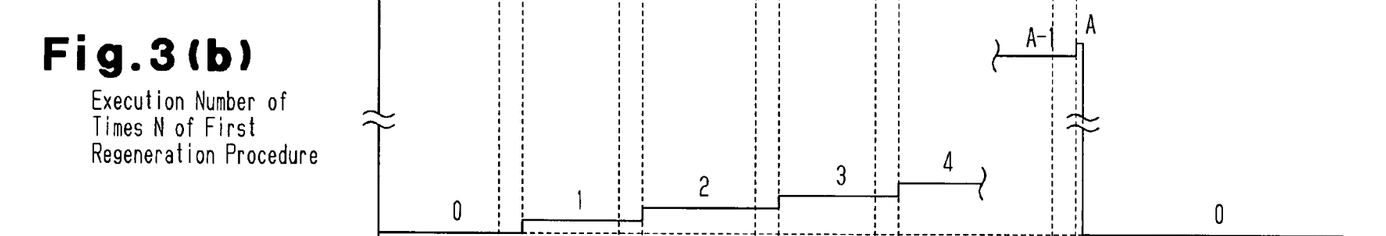
Figures 3C, 3D:
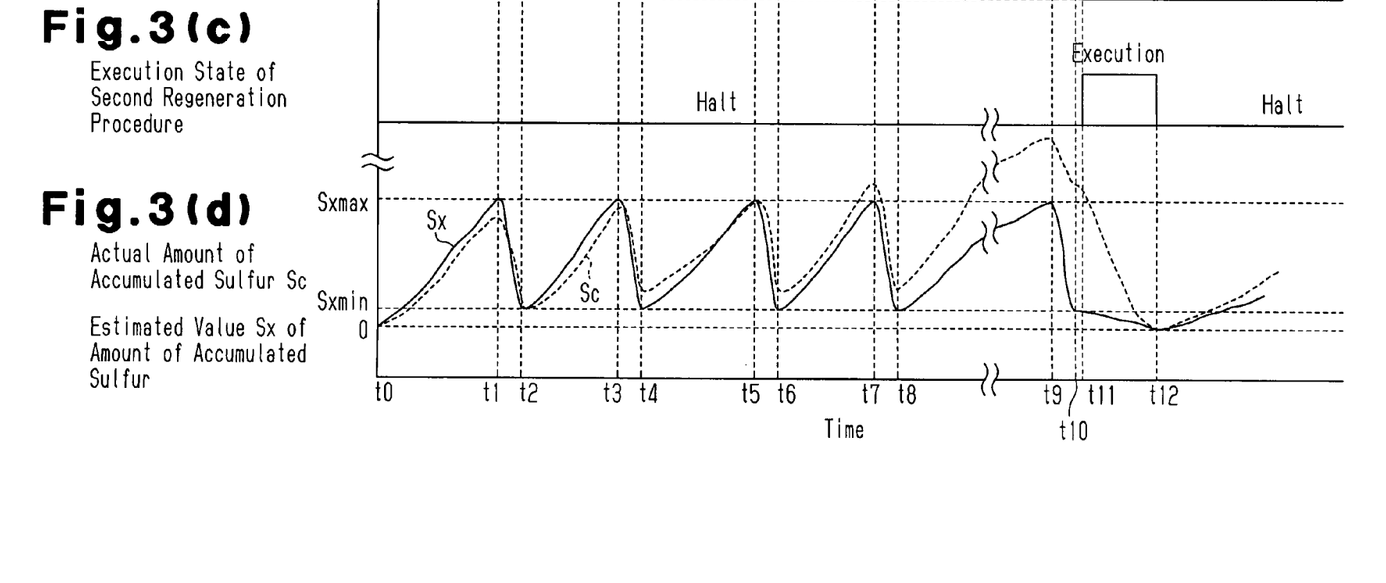

As shown in FIG. 3(b), the execution number of times N of the first regeneration procedure is incremented to be 1 at time t2. Then, as shown in FIG. 3(a), the first regeneration procedure is executed during a period from t3 to time t4, a period from t5 to t6, a period from t7 to t8 . . . as in the case of the period from time t1 to t2. At this time, as shown by the solid line in FIG. 3(d), the estimated value Sx of the amount of accumulated sulfur increases while the first regeneration procedure is in halted state and decreases while the first regeneration procedure is being executed.

As shown in FIG. 3(b), the execution number of times N of the first regeneration procedure is incremented to 2, 3, 4, and so on. As described above, the first regeneration procedure is executed such that the estimated value Sx of the amount of accumulated sulfur does not become equal to or greater than the determination value Sxmax. However, deviation is caused between the estimated value Sx and the actual amount of accumulated sulfur Sc. Therefore, the first regeneration procedure is repeatedly executed and halted. That is, if sulfur is repeatedly accumulated in the filter and released from the filter, the actual amount of accumulated sulfur Sc repeatedly increases and decreases and gradually decreases as shown by a dotted line in FIG. 3(d), and the actual amount of accumulated sulfur Sc becomes equal to or greater than the determination value Sxmax. However, if the first regeneration procedure that is executed during a period from t9 to t10 that is the first regeneration procedure of the number of execution times of A-1 is completed and the number of execution times N reaches the value A at time t10, the second regeneration procedure is executed at time t11 as shown in FIG. 3(c). Accordingly, as shown by a dotted line in FIG. 3(d), the actual amount of accumulated sulfur Sc decreases and becomes zero at time t12. That is, sulfur is completely released from the filter 35. If the second regeneration procedure is executed at time t11, the number of execution times N is set to zero as shown in FIG. 3(b).

According to the exhaust emission purifier of an internal combustion engine of the present embodiment, the following advantages are obtained.

(1) On condition that the estimated value Sx of the amount of accumulated sulfur is equal to or greater than the determination value Sxmax, the first regeneration procedure for raising the temperature of the filter 35 up to the temperature $\alpha$ and releasing sulfur from the filter 35 by lowering the exhaust air-fuel ratio A/F is executed. Accordingly, the exhaust purifying function of the filter 35 is recovered.

(2) On condition that the number of execution times N of the first regeneration procedure after the execution of the second regeneration procedure is equal to or greater than the determination number of times A, the second regeneration procedure is executed separately from the first regeneration procedure, in which second regeneration procedure sulfur is released from the filter 35 completely by raising the temperature of the filter 35 up to the temperature $\beta$ and lowering the exhaust air-fuel ratio. When the second regeneration procedure is completed, the estimated value Sx of the amount of accumulated sulfur is reset to zero. Accordingly, even if the deviation between the actual amount of accumulated sulfur and the estimated value Sx increases, the deviation can be corrected appropriately and the emission is prevented from deteriorating.

(3) When the temperature of the filter 35 is raised in the first and second regeneration procedures, the temperature of the filter 35 during the regeneration procedure is preferably set to be within such a temperature range that thermal deterioration of the filter 35 does not progress. If the temperature of the filter 35 is low, sulfur is not sufficiently released and the regeneration procedure may be halted before sulfur is completely released from the filter 35.

In the first regeneration procedure of the present embodiment, prevention of thermal deterioration of the catalyst is prioritized. That is, when the temperature of the filter 35 is raised, its maximum temperature is set to the temperature ($\alpha$), which does not cause thermal deterioration of the filter 35. In the second regeneration procedure, early regeneration of the filter 35 is prioritized. That is, the temperature of the filter 35 is raised to the temperature ($\beta$), which may cause thermal deterioration of the filter 35. Accordingly, the period of the regeneration procedure is shortened. Even if the temperature of the filter 35 is raised to be the temperature ($\beta$), which may cause the thermal deterioration of the filter 35, the period of the regeneration procedure of the filter 35 is shortened. This sufficiently suppresses damage caused by heat.

The exhaust emission purifier of an internal combustion engine according to the present invention is not limited to have the configuration described in the above embodiment, but may be modified to have the following configuration.

In the above embodiment, the temperature of the filter 35 is raised by injecting fuel to the exhaust passage 33 by the fuel adding valve 44. The fuel adding valve 44 may be omitted, and fuel may be injected during the exhaust stroke to execute the post fuel injection and raise the temperature of the filter 35.

In the above embodiment, on condition that (A) the execution number of times N of the first regeneration procedure after the execution of the second regeneration procedure is equal to or greater than the determination number of times A, the second regeneration procedure is executed. However, the predetermined condition for executing the second regeneration procedure is not limited thereto. For example, when at least one of the conditions (A) to (D) is met, that is, when the logical OR of the conditions (A) to (D) is ture, the second regeneration procedure may be executed. The conditions are (B) The traveled distance of the vehicle after the execution of the second regeneration procedure is equal to or greater than a determination distance, (C) The engine operating period after the execution of the second regeneration procedure is equal to or longer than a determination period, and (D) The fuel injection amount accumulation value after the execution of the second regeneration procedure is equal to or greater than a determination value. In this case, sulfur accumulated in the filter 35 is surely released before the actual amount of accumulated sulfur Sc is excessively separated from the estimated value Sx. This eliminates deterioration of the exhaust gas purifying function of the filter 35 at an early stage.

The second regeneration procedure may be executed if all the conditions (A) to (D) are met, that is, when the logical AND of the conditions (A) to (D) is ture. In this case, if the deviation between the actual amount of accumulated sulfur Sc and the estimated value Sx is small and reduction of the exhaust gas purifying function of the filter 35 does not cause any problems, ineffective execution of the second regeneration procedure is avoided. Therefore, it is possible to prevent any limitation from being applied to the engine control according to the execution of the second regeneration procedure.

In the above embodiment, the temperature of the filter 35 is raised to the temperature $\alpha$ in the first regeneration procedure, and the temperature of the filter 35 is raised to the temperature β in the second regeneration procedure. However, the temperature β can be set to the maximum temperature within the temperature range in which the thermal deterioration of the filter 35 does not progress. In this case, for releasing sulfur completely from the filter 35 in the second regeneration procedure, the predetermined period required for the second regeneration procedure may be extended if necessary.

The filter 35 of the above embodiment is provided with the porous ceramic structure that captures PM (particulate matter) in exhaust gas and the NOx storage reduction catalyst, which is supported on the surface of the ceramic structure. However, the catalyst of the above invention is not limited thereto but may be modified as long as the catalyst purifies exhaust gas.

In the above embodiment, the estimated value increase amount Sinc is computed based on the fuel injection amount from the fuel injection valves 41 and the fuel addition amount from the fuel adding valve 44 as shown in the expression 1 and expression 2, and the estimated value decrease amount Sdec is computed based on the exhaust air-fuel ratio A/F and the exhaust gas temperature Te so as to estimate the amount of accumulated sulfur in the catalyst. However, the estimation section is not limited thereto but may be modified as long as the estimation section estimates the amount of accumulated sulfur in the catalyst based on the operating state of the engine.

In the above embodiment, the second regeneration procedure for releasing sulfur completely from the catalyst by raising the temperature of the catalyst to be higher than the first temperature and lowering the exhaust air-fuel ratio is executed separately from the first regeneration procedure. However, the second regeneration procedure is not limited thereto. For example, in case of employing a first regeneration procedure in which sulfur is released from the catalyst by raising the temperature of the catalyst for a first predetermined period and lowering the exhaust air-fuel ratio, a second regeneration procedure may be executed separately from the first regeneration procedure. In the second regeneration procedure, sulfur is completely released from the catalyst by raising the temperature of the catalyst for a period longer than the first predetermined period and lowering the exhaust air-fuel ratio. In this case, even if the deviation between the actual amount of accumulated sulfur and the estimated value increases, the deviation can be corrected appropriately and the emission is prevented from deteriorating.

For example, in case of employing a first regeneration procedure in which sulfur is released from the catalyst by raising the temperature of the catalyst to the first predetermined temperature for the first predetermined period and lowering the exhaust air-fuel ratio, a second regeneration procedure may be executed separately from the first regeneration procedure. In the second regeneration procedure, sulfur is completely released from the catalyst by raising the temperature of the catalyst to be a temperature higher than the first predetermined temperature for a period longer than the first predetermined period and lowering the exhaust air-fuel ratio. In this case also, even if the deviation between the actual amount of accumulated sulfur and the estimated value increases, the deviation can be corrected appropriately and the emission is prevented from deteriorating.

In the above embodiment, sulfur and its compound are examples of the poisoning material. However, the exhaust emission purifier of the internal combustion engine of the present invention is capable of removing from the catalyst any poisoning material that lowers the function of the catalyst and can released from the catalyst by raising the temperature of the catalyst. Such materials include aromatic compounds, chlorine compounds, silicon compounds, and silicon compounds.

The invention claimed is:

1. An exhaust emission purifier of an internal combustion engine, comprising a catalyst that is provided in an exhaust system of the internal combustion engine to purify exhaust gas, and an electronic control unit,
   wherein the electronic control unit is configured to estimate an amount of accumulated poisoning material in the catalyst based on an operating state of the engine, and the electronic control unit is configured to execute a first regeneration procedure by raising a temperature of the catalyst up to a first predetermined temperature and lowering an exhaust air-fuel ratio on condition that an estimated value of the amount of accumulated poisoning material is equal to or greater than a predetermined determination value,
   the electronic control unit is configured to determine whether a degree of a deviation between the estimated value of the amount of accumulated poisoning material in the catalyst and an actual amount of accumulated poisoning material in the catalyst reaches a predetermined degree, and
   when the degree of the deviation reaches the predetermined degree, the electronic control unit is configured to execute a second regeneration procedure separately from the first regeneration procedure by raising the temperature of the catalyst up to a temperature higher than the first predetermined temperature and lowering the exhaust air-fuel ratio, so that the deviation is eliminated upon completion of the second regeneration procedure.

2. The exhaust emission purifier according to claim 1, wherein the internal combustion engine is mounted in a vehicle, and, when the logical OR of the following conditions (1) to (4) is true, the electronic control unit is configured to determine that the degree of the deviation reaches the predetermined degree and to execute the second regeneration procedure:
   (1) the number of execution times of the first regeneration procedure after execution of the second regeneration procedure is equal to or greater than a determination number of times,
   (2) the traveled distance of the vehicle after the execution of the second regeneration procedure is equal to or longer than a determination distance,
   (3) the engine operation time after the execution of the second regeneration procedure is equal to or longer than determination period, and
   (4) the accumulated value of a fuel injection amount after the execution of the second regeneration procedure is equal to or greater than a predetermined amount.

3. The exhaust emission purifier according claim 1, wherein the internal combustion engine is mounted in a vehicle, and, when the logical AND of the following conditions (1) to (4) is true, the electronic control unit is configured to determine that the degree of the deviation reaches the predetermined degree and to execute the second regeneration procedure,
   (1) the number of execution times of the first regeneration procedure after execution of the second regeneration procedure is equal to or greater than a determination number of times, (2) the traveled distance of the vehicle after the execution of the second regeneration procedure is equal to or longer than a determination distance, (3) the engine operation time after the execution of the second regeneration procedure is equal to or longer than determination period, and (4) the accumulated value of a fuel injection amount after the execution of the second regeneration procedure is equal to or greater than a predetermined amount.

4. The exhaust emission purifier according to claim 1, wherein the poisoning material is sulfur.

5. An exhaust emission purifier of an internal combustion engine, comprising a catalyst that is provided in an exhaust system of the internal combustion engine to purify exhaust gas, and an electronic control unit, wherein the electronic control unit is configured to estimate an amount of accumulated poisoning material in the catalyst based on an operating state of the engine, and the electronic control unit is configured to execute a first regeneration procedure by raising a temperature of the catalyst for a first predetermined period and lowering an exhaust air-fuel ratio on condition that an estimated value of the amount of accumulated poisoning material is equal to or greater than a predetermined determination value, the electronic control unit is configured to determine whether a degree of a deviation between the estimated value of the amount of accumulated poisoning material in the catalyst and an actual amount of accumulated poisoning material in the catalyst reaches a predetermined degree, and when the degree of the deviation reaches the predetermined degree, the electronic control unit is configured to execute a second regeneration procedure separately from the first regeneration procedure by raising the temperature of the catalyst for a period longer than the first predetermined period and lowering the exhaust air-fuel ratio, so that the deviation is eliminated upon completion of the second regeneration procedure.

6. The exhaust emission purifier according to claim 5, wherein the internal combustion engine is mounted in a vehicle, and, when the logical OR of the following conditions (1) to (4) is true, the electronic control unit is configured to determine that the degree of the deviation reaches the predetermined degree and to execute the second regeneration procedure:

(1) the number of execution times of the first regeneration procedure after execution of the second regeneration procedure is equal to or greater than a determination number of times, (2) the traveled distance of the vehicle after the execution of the second regeneration procedure is equal to or longer than a determination distance, (3) the engine operation time after the execution of the second regeneration procedure is equal to or longer than determination period, and (4) the accumulated value of a fuel injection amount after the execution of the second regeneration procedure is equal to or greater than a predetermined amount.

7. The exhaust emission purifier according to claim 5, wherein the internal combustion engine is mounted in a vehicle, and, when the logical AND of the following conditions (1) to (4) is true, the electronic control unit is configured to determine that the degree of the deviation reaches the predetermined degree and to execute the second regeneration procedure, (1) the number of execution times of the first regeneration procedure after execution of the second regeneration procedure is equal to or greater than a determination number of times, (2) the traveled distance of the vehicle after the execution of the second regeneration procedure is equal to or longer than a determination distance, (3) the engine operation time after the execution of the second regeneration procedure is equal to or longer than determination period, and (4) the accumulated value of a fuel injection amount after the execution of the second regeneration procedure is equal to or greater than a predetermined amount.

8. The exhaust emission purifier according to claim 5, wherein the poisoning material is sulfur.

9. An exhaust emission purifier of an internal combustion engine, comprising a catalyst that is provided in an exhaust system of the internal combustion engine to purify exhaust gas, and an electronic control unit, wherein the electronic control unit is configured to estimate an amount of accumulated poisoning material in the catalyst based on an operating state of the engine, and the electronic control unit is configured to execute a first regeneration procedure by raising a temperature of the catalyst up to a first predetermined temperature for a first predetermined period and lowering an exhaust air-fuel ratio on condition that an estimated value of the amount of accumulated poisoning material is equal to or greater than a predetermined determination value, the electronic control unit is configured to determine whether a degree of a deviation between the estimated value of the amount of accumulated poisoning material in the catalyst and an actual amount of accumulated poisoning material in the catalyst reaches a predetermined degree, and when the degree of the deviation reaches the predetermined degree, the electronic control unit is configured to execute a second regeneration procedure separately from the first regeneration procedure by raising the temperature of the catalyst for a period longer than the first predetermined period up to a temperature higher than the first predetermined temperature and lowering the exhaust air-fuel ratio, so that the deviation is eliminated upon completion of the second regeneration procedure.

10. The exhaust emission purifier according to claim 9, wherein the internal combustion engine is mounted in a vehicle, and, when the logical OR of the following conditions (1) to (4) is true, the electronic control unit is configured to determine that the degree of the deviation reaches the predetermined degree and to execute the second regeneration procedure:

(1) the number of execution times of the first regeneration procedure after execution of the second regeneration procedure is equal to or greater than a determination number of times, (2) the traveled distance of the vehicle after the execution of the second regeneration procedure is equal to or longer than a determination distance, (3) the engine operation time after the execution of the second regeneration procedure is equal to or longer than determination period, and (4) the accumulated value of a fuel injection amount after the execution of the second regeneration procedure is equal to or greater than a predetermined amount.

11. The exhaust emission purifier according to claim 9, wherein the internal combustion engine is mounted in a vehicle, and, when the logical AND of the following conditions (1) to (4) is true, the electronic control unit is configured to determine that the degree of the deviation reaches the predetermined degree and to execute the second regeneration procedure,
- (1) the number of execution times of the first regeneration procedure after execution of the second regeneration procedure is equal to or greater than a determination number of times,
- (2) the traveled distance of the vehicle after the execution of the second regeneration procedure is equal to or longer than a determination distance,
- (3) the engine operation time after the execution of the second regeneration procedure is equal to or longer than determination period, and
- (4) the accumulated value of a fuel injection amount after the execution of the second regeneration procedure is equal to or greater than a predetermined amount.

12. The exhaust emission purifier according to claim 9, wherein the poisoning material is sulfur.

* * * * *